United States Patent
Chang et al.

(10) Patent No.: US 8,665,279 B2
(45) Date of Patent: Mar. 4, 2014

(54) ELECTRICAL DEVICE SUPPORTING SWITCHABLE GRAPHICS FUNCTION AND METHOD FOR CONTROLLING THEREOF

(75) Inventors: Yung-Yen Chang, Taipei Hsien (TW); Yuan-Heng Wu, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 636 days.

(21) Appl. No.: 12/793,683

(22) Filed: Jun. 4, 2010

(65) Prior Publication Data

US 2011/0074793 A1    Mar. 31, 2011

(30) Foreign Application Priority Data

Sep. 30, 2009 (TW) ................................ 98133220 A

(51) Int. Cl.
  *G06F 15/14* (2006.01)
(52) U.S. Cl.
  USPC .............................. 345/502; 345/519; 345/520
(58) Field of Classification Search
  USPC .......................................... 345/502, 519, 520
  See application file for complete search history.

(56) References Cited

U.S. PATENT DOCUMENTS

| | | | |
|---|---|---|---|
| 7,602,371 B2 * | 10/2009 | Sultenfuss et al. ............. | 345/102 |
| 2005/0259113 A1 * | 11/2005 | Endo et al. ..................... | 345/604 |
| 2007/0171230 A1 * | 7/2007 | Iwase et al. .................... | 345/519 |
| 2009/0153528 A1 * | 6/2009 | Orr ................................ | 345/204 |
| 2010/0033120 A1 * | 2/2010 | Wang ............................. | 318/471 |

* cited by examiner

*Primary Examiner* — James A Thompson
*Assistant Examiner* — Sarah Le
(74) *Attorney, Agent, or Firm* — CKC & Partners Co., Ltd.

(57) ABSTRACT

An electrical device supporting switchable graphics function, electrically connected with a display unit, includes a first graphic chip, a second graphic chip, a peripheral, an Embedded Controller (EC) and a processing unit. Information of a present graphic chip is stored in an EC RAM of the EC, wherein the present graphic chip is one of the first graphic chip and the second graphic chip. A control unit of the EC obtains the information of the present graphic chip from the EC RAM and controls operation status of the peripheral according to the obtained information of the present graphic chip. The processing unit obtains the information of the present graphic chip from the EC RAM. The processing unit drives the present graphic chip to process an image signal and transmit the processed image signal to the display unit for display according to the obtained information of the present graphic chip.

14 Claims, 3 Drawing Sheets

ELECTRICAL DEVICE SUPPORTING SWITCHABLE GRAPHICS FUNCTION AND METHOD FOR CONTROLLING THEREOF

RELATED APPLICATIONS

This application claims priority to Taiwan Application Serial Number 98133220, filed Sep. 30, 2009, which is herein incorporated by reference.

BACKGROUND

1. Technical Field

The present invention relates to an electrical device and method for controlling thereof. More particularly, the present invention relates to an electrical device supporting switchable graphics function and method for controlling thereof.

2. Description of Related Art

A graphics processing unit (GPU), also occasionally called visual processing unit (VPU), is a specialized processor that offloads graphics rendering from the microprocessor. Wherein, GPU includes the following types: integrated graphic chips and discrete graphic chips.

Integrated graphic chips offer lower cost and longer battery life, but lack any great 3D performance partially due to using shared system memory. Integrated graphic chips are comparable to discrete graphic for day-to-day use, but lack the performance needed for intense 3D applications or games. Discrete graphic chips are more powerful, have dedicated video memory, and are the preferred choice for 3D applications and games, but consume more power and therefore can reduce the amount of time the notebook can run on battery.

To combine the low power advantages of an integrated graphic chip with the performance of a discrete graphics chip, switchable graphic function is provided. An electrical device supporting switchable graphic function can utilize one of the integrated graphic chip and the discrete graphics chip for graphic processing. However, since switching of the graphic chip is controlled through a driver, it is difficult to change operation status of peripherals of the same device through the driver as the graphic chip switched. For example, in the prior art, it's hard to control cooling fans rotating at different speeds through drivers according to the different graphic chips being utilized for graphic processing through the driver. In addition, drivers can only control operation status of peripherals under Operating System (OS).

SUMMARY

According to one embodiment of this invention, an electrical device supporting switchable graphics function, electrically connected with a display unit, is provided. The electrical device supporting switchable graphics function includes a first graphic chip, a second graphic chip, a peripheral, an EC and a processing unit. The EC, electrically connected with the peripheral, includes an EC RAM and a control unit. The EC RAM stores information of a present graphic chip, wherein the present graphic chip is one of the first graphic chip and the second graphic chip. The control unit, electrically connected with the EC RAM, includes a first obtaining module and a peripheral-controlling module. The first obtaining module obtains the information of the present graphic chip from the EC RAM. The peripheral-controlling module controls operation status of the peripheral according to the obtained information of the present graphic chip. The processing unit, electrically connected with the first graphic chip, the second graphic chip and the EC, includes a second obtaining module and a driving module. The second obtaining module obtains the information of the present graphic chip from the EC RAM. When the present graphic chip is the first graphic chip, the driving module drives the first graphic chip to process an image signal and transmit the processed image signal to the display unit for display. When the present graphic chip is the second graphic chip, the driving module drives the second graphic chip to process the image signal and transmit the processed image signal to the display unit for display.

According to another embodiment of this invention, an electrical device supporting switchable graphics function is provided. The electrical device is supporting switchable graphics function includes a first graphic chip, a second graphic chip, a display unit, an EC and a processing unit. The display unit is electrically connected with the first graphic chip and the second graphic chip. The EC, electrically connected with the display unit, includes an EC RAM and a control unit. The EC RAM stores information of a present graphic chip, wherein the present graphic chip is one of the first graphic chip and the second graphic chip. The control unit, electrically connected with the EC RAM, includes a first obtaining module and a brightness-controlling module. The first obtaining module obtains the information of the present graphic chip from the EC RAM. The brightness-controlling module controls display brightness of the display unit according to the obtained information of the present graphic chip. When the present graphic chip is the first graphic chip, the brightness-controlling module controls the display unit to display with first display brightness. When the present graphic chip is the second graphic chip, the brightness-controlling module controls the display unit to display with second display brightness. The processing unit, electrically connected with the first graphic chip, the second graphic chip and the EC, includes a second obtaining module and a driving module. The second obtaining module obtains the information of the present graphic chip from the EC RAM. When the present graphic chip is the first graphic chip, the driving module drives the first graphic chip to process an image signal and transmit the processed image signal to the display unit for display. When the present graphic chip is the second graphic chip, the driving module drives the second graphic chip to process the image signal and transmit the processed image signal to the display unit for display.

According to another embodiment of this invention, a method for controlling a peripheral of an electrical device supporting switchable graphics function is provided. The electrical device supporting switchable graphics function includes a first graphic chip, a second graphic chip, the peripheral, a processing unit and an EC. The EC includes an EC RAM. Information of a present graphic chip is stored in the EC RAM. The method for controlling the peripheral of the electrical device supporting switchable graphics function includes the following steps: the information of the present graphic chip is obtained from the EC RAM. Wherein, the present graphic chip is one of the first graphic chip and the second graphic chip. The processing unit drives the present graphic chip to process an image signal and transmits the processed image signal to a display unit for display. The EC controls operation status of the peripheral according to the obtained information of the present graphic chip.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
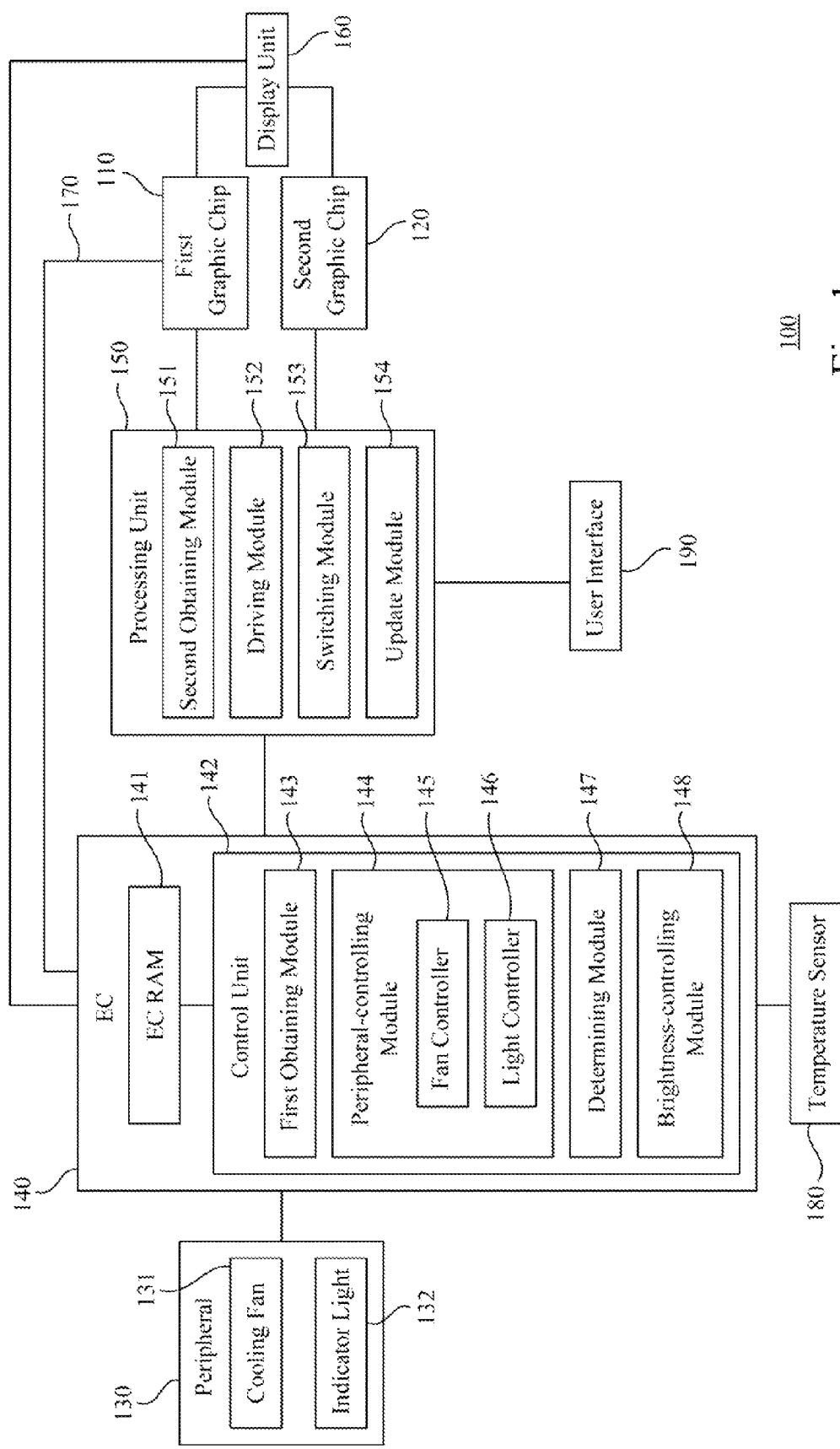
FIG. 1 is a block diagram of an electrical device supporting switchable is graphics function according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of an electrical device supporting switchable graphics function according to one embodiment of this invention. The electrical device supporting switchable graphics function controls operation status of its peripheral according to the graphic chip being utilized for graphic processing.

The electrical device supporting switchable graphics function 100 includes a first graphic chip 110, a second graphic chip 120, a peripheral 130, an EC 140 and a processing unit 150. The first graphic chip 110 and the second graphic chip 120 are electrically connected with a display unit 160, wherein the display unit 160 may be part of the electrical device supporting switchable graphics function 100 or connected with the electrical device supporting switchable graphics function 100 externally. The EC 140 is electrically connected with the peripheral 130. The EC 140 may be Keyboard Controller (KBC) or other types of EC. The processing unit 150 is electrically connected with the first graphic chip 110, the second graphic chip 120 and the EC 140. In this embodiment, heat generated by the first graphic chip 110 when the first graphic chip 110 is enabled is more than heat generated by the second graphic chip 120 when the second graphic chip 120 is enabled. In other embodiments, heat generated by the first graphic chip when the first graphic chip is enabled may be less than or the same as heat generated by the second graphic chip when the second graphic chip is enabled, which should not be limited in this embodiment.

The EC 140 includes an EC RAM 141 and a control unit 142. Information of a present graphic chip is stored in the EC RAM 141. The present graphic chip, which is being utilized for graphic processing, is one of the first graphic chip 110 and the second graphic chip 120. The control unit 142, electrically connected with the EC RAM 141, includes a first obtaining module 143 and a peripheral-controlling module 144. The first obtaining module 143 obtains the information of the present graphic chip from the EC RAM 141. The peripheral-controlling module 144 controls operation status of the peripheral 130 according to the obtained information of the present graphic chip.

The processing unit 150 includes a second obtaining module 151 and a driving module 152. The second obtaining module 151 obtains the information of the present graphic chip from the EC RAM 142 to determine that the present graphic chip is the first graphic chip 110 or the second graphic chip 120. When the present graphic chip is the first graphic chip 110, the driving module 152 drives the first graphic chip 110 to process an image signal and transmit the processed image signal to the display unit 160 for display. When the present graphic chip is the second graphic chip 120, the driving module 152 drives the second graphic chip 120 to process the image signal and transmit the processed image signal to the display unit 160 for display. Therefore, the electrical device supporting switchable graphics function 100 can utilize one of the first graphic chip 110 and the second graphic chip 120 for graphic processing.

In addition, the processing unit 150 may include a switching module 153 and an update module 150. When a switch signal is received, the switching module 153 switches the present graphic chip to the other graphic chip. In detail, when the present graphic chip is the first graphic chip 110 and the switch signal is received, the switching module 153 switches the present graphic chip from the first graphic chip 110 to the second graphic chip 120; when the present graphic chip is the second graphic chip 120 and the switch signal is received, the switching module 153 switches the present graphic chip from the second graphic chip 120 to the first graphic chip 110. Besides, the electrical device supporting switchable graphics function 100 may include a user interface 190, such as a mouse, a keyboard, a touch pad, a touch screen, a button, a hotkey or other types of user interfaces. Thus, the switch signal can be generated through the user interface 190 when users do a switching operation on the user interface 190.

Then, the driving module 152 drives the switched present graphic chip to process the image signal and transmit the processed image signal to the display unit 160 for display. The update module 154 updates the information of the switched present graphic chip into the EC RAM 141. Therefore, the EC 140 can control operation status of the peripheral 130 according to the updated information of the present graphic chip stored in the EC RAM 141.

The peripheral 130 may include a cooling fan 131, at least one indicator light 132 or other types of peripherals. Therefore, the peripheral-controlling module 144 may include a fan controller 145 for controlling the cooling fan 131, a light controller 146 for controlling the indicator light 132 or other types of peripheral controller.

In this embodiment, the first graphic chip 110 may be a discrete graphic chip and the second graphic chip 120 may be an integrated graphic chip, which causes that heat generated by the first graphic chip 110 when the first graphic chip 110 is enabled is more than heat generated by the second graphic chip 120 when the second graphic chip 120 is enabled. When the present graphic chip is the first graphic chip 110, the fan controller 145 controls the cooling fan 131 rotating at first rotational speed. When the present graphic chip is the second graphic chip 120, the fan controller 145 controls the cooling fan 131 rotating at second rotational speed. The first rotational speed may be faster than the second rotational speed for better cooling efficiency.

In addition, although the present graphic chip is the second graphic chip 120, more heat may be generated if the first graphic chip 110 is enabled. Therefore, the control unit 142 may include a determining module 147 for determining if the first graphic chip 110 is enabled. When the first graphic chip 110 is enabled and the present graphic chip is the second graphic chip 120, the fan controller 145 controls the cooling fan 131 rotating at the first rotational speed for better cooling efficiency. Wherein, the enable status of the first graphic chip 110 may be stored in the EC RAM 141, such that the determining module 147 can determine according to the enable status of the first graphic chip 110 stored in the EC RAM 141. In addition, the EC 140 may be electrically connected with the first graphic chip 110 through a General Purpose Input/Output (GPIO) 170, and the determining module 147 may obtain enable status of the first graphic chip 110 through GPIO 170. Therefore, the cooling fan 131 may rotate at different rotational speed to provide suitable cooling efficiency.

Besides, the cooling fan 131 may rotate at different rotational speed according to device temperature inside the electrical device supporting switchable graphics function 100. Therefore, the electrical device supporting switchable graphics function 100 may include a temperature sensor 180 electrically connected with the EC 140. The temperature sensor 180 measures device temperature inside the electrical device supporting switchable graphics function 100. Then, the fan controller 145 controls the cooling fan 131 rotating in a first rotating mode according to the device temperature when the present graphic chip is the first graphic chip 110. When the present graphic chip is the second graphic chip 120, the fan controller 145 controls the cooling fan 131 rotating in a second rotating mode according to the device temperature. Wherein, cooling efficiency of the cooling fan 131 rotating in the first rotating mode is better than that of the cooling fan 131 rotating in the second rotating mode. In addition, when the first chip 110 is enabled and the present graphic chip is the second graphic chip 120, the fan controller 145 may control the cooling fan 131 rotating in the first rotating mode according to the device temperature for better cooling efficiency. Therefore, the cooling fan 131 rotates in different mode to provide suitable cooling efficiency.

The electrical device supporting switchable graphics function 100 may generate different light signals showing which graphic chip is being utilized for graphic processing. Therefore, the light controller 146 controls the indicator light 132 to generate a first light signal when the present graphic chip is the first graphic chip 110; the light controller 146 controls the indicator light 132 to generate a second light signal when the present graphic chip is the second graphic chip 120. Then, users can determine which graphic chip is being utilized for graphic processing according to the light signal.

The EC 140 may control the display unit 160 to display with different brightness according to the graphic chips being utilized for graphic processing. Therefore, the EC 140 may be electrically connected with the display unit 160, and the EC 140 may include a brightness-controlling module 148. The brightness-controlling module 148 controls display brightness of the display unit 160 according to the information of the present graphic chip obtained from the EC RAM 141. In detail, the brightness-controlling module 148 controls the display unit 160 to display with first display brightness when the present graphic chip is the first graphic chip 110; the brightness-controlling module 148 controls the display unit 160 to display with second display brightness when the present graphic chip is the second graphic chip 120. Since the second graphic chip 120 is an integrated graphic chip, which consumes less power than the first graphic chip does, the second graphic chip 120 is often utilized for graphic processing in power-saving mode. Therefore, for reducing more power consumption of the electrical device supporting switchable graphics function 100 when the second graphic chip 120 is utilized for graphic processing, the second brightness may be darker than the first brightness.

Figure 2:
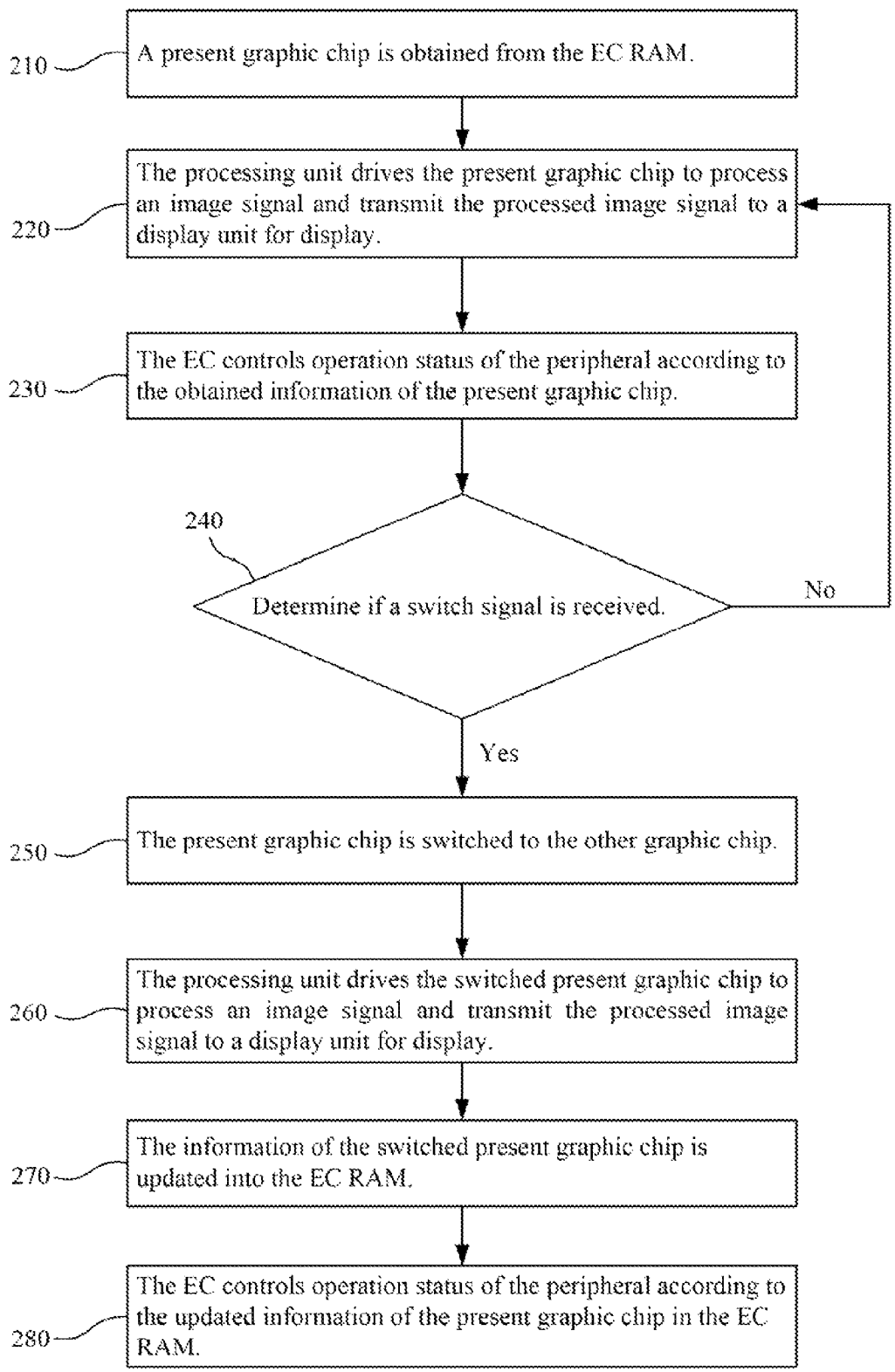
FIG. 2 is a flow diagram of a method for controlling a peripheral of an electrical device supporting switchable graphics function according to another embodiment of this invention.

FIG. 2 is a flow diagram of a method for controlling a peripheral of an electrical device supporting switchable graphics function according to another embodiment of this invention. In the method for controlling the peripheral of the electrical device supporting switchable graphics function, operation status of the peripheral is controlled according to the graphic chip being utilized for graphic processing.

The electrical device supporting switchable graphics function includes a first graphic chip, a second graphic chip, the peripheral, a processing unit and an EC. The EC includes an EC RAM. Information of a present graphic chip is stored in the EC RAM. The method for controlling the peripheral of the electrical device supporting switchable graphics function 200 includes the following steps:

In step 210, a present graphic chip is obtained from the EC RAM. The present graphic chip, which is being utilized for graphic processing, is one of the first graphic chip and the second graphic chip.

In step 220, the processing unit drives the present graphic chip to process an image signal and transmit the processed image signal to a display unit for display. In detail, when the present graphic chip is the first graphic chip, the processing unit drives the first graphic chip to process an image signal and transmit the processed image signal to the display unit for display. When the present graphic chip is the second graphic chip, the processing unit drives the second graphic chip to process the image signal and transmit the processed image signal to the display unit for display.

In step 230, the EC controls operation status of the peripheral according to the obtained information of the present graphic chip. Therefore, the electrical device supporting switchable graphics function can utilize different graphic chip for graphic process, and control operation status of its peripheral as the graphic chip being utilized for graphic processing differs.

The method for controlling the peripheral of the electrical device supporting switchable graphics function 200 may include step 240 to determine if a switch signal is received. Wherein, the switch signal may be received through a user interface, such as a mouse, a keyboard, a touch pad, a touch screen, a button, a hotkey or other types of user interfaces. In addition, the switch signal may be generated when power supply of the electrical device supporting switchable graphics function is switched. For example, when power supply of the electrical device supporting switchable graphics function is switched from a battery to an AC adaptor or from an AC adaptor to a battery, the switch signal may be generated. Therefore, the graphic chip being utilized for graphic processing can be switched as the power supply is switched.

If the switch signal is not received, the processing unit keeps driving the present graphic chip to process an image signal and transmit the processed image signal to a display unit for display (step 220).

In step 250, if the switch signal is received, the present graphic chip is switched to the other graphic chip. In detail, when the present graphic chip is the first graphic chip and the switch signal is received, the present graphic chip is switched from the first graphic chip to the second graphic chip; when the present graphic chip is the second graphic chip and the switch signal is received, the present graphic chip is switched from the second graphic chip to the first graphic chip.

In step 260, the processing unit drives the switched present graphic chip to process an image signal and transmit the processed image signal to a display unit for display.

In step 270, the information of the switched present graphic chip is updated into the EC RAM.

Then, in step 280, the EC controls operation status of the peripheral according to the updated information of the present graphic chip in the EC RAM.

Figure 3:
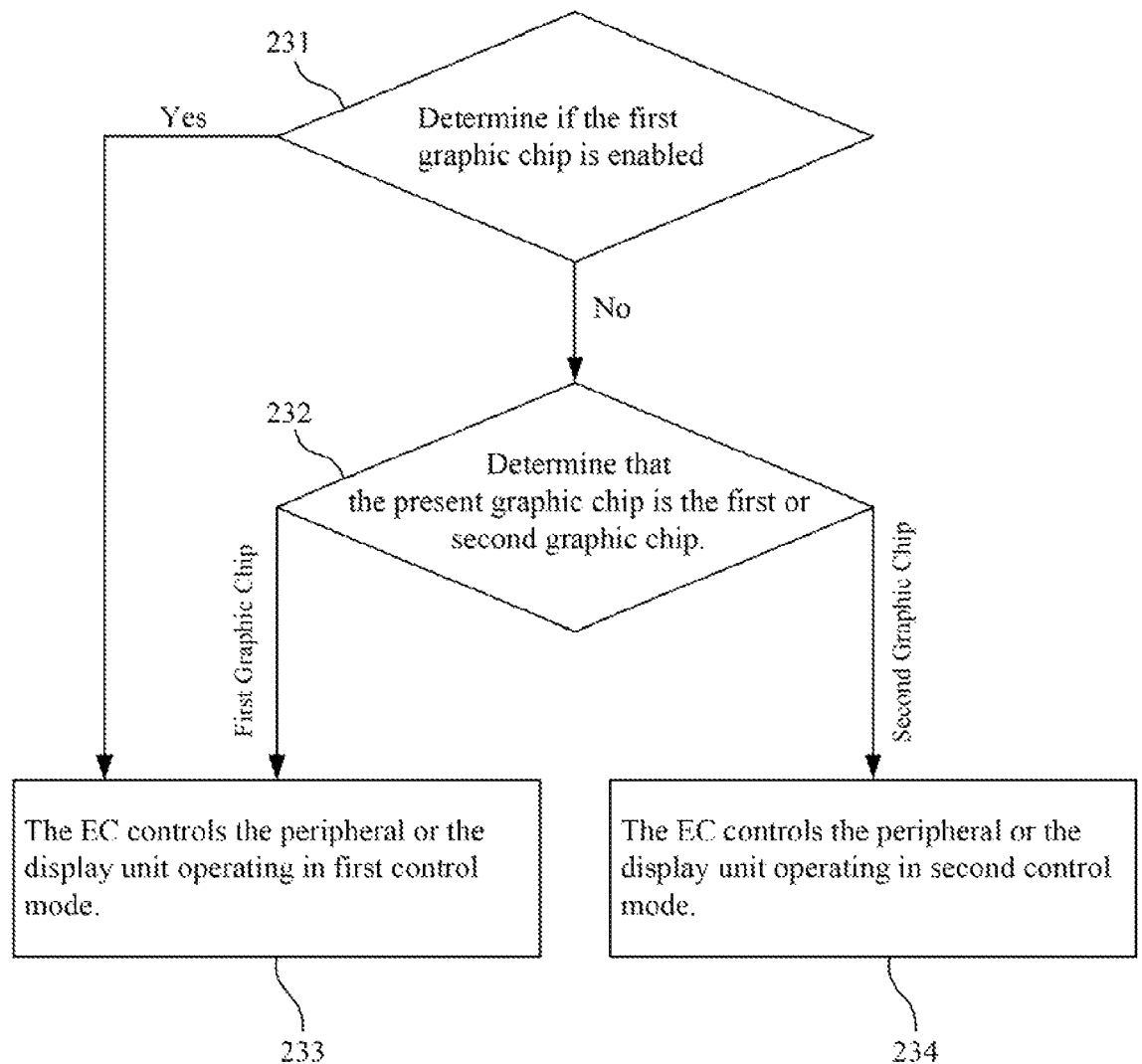
FIG. 3 is an embodiment of the step of the EC controlling operation status of the peripheral according to the obtained information of the present graphic chip (step 230) in FIG. 2.

FIG. 3 is an embodiment of the step of the EC controlling operation status of the peripheral according to the obtained information of the present graphic chip (step 230) in FIG. 2. The step of the EC controlling operation status of the peripheral according to the obtained information of the present graphic chip (step 230) may include the following steps:

In step 232, determine that the present graphic chip is the first or second graphic chip.

In step 233, when the present graphic chip is the first graphic chip, the EC controls the peripheral or the display unit operating in first control mode.

In step 234, when the present graphic chip is the second graphic chip, the EC controls the peripheral or the display unit operating in second control mode.

Wherein, the peripheral may include a cooling fan. In step 233, the EC may control the cooling fan rotating at a first rotational speed as the first control mode. Besides, in step 234, the EC may control the cooling fan rotating at a second rotational speed as the second control mode.

In another embodiment, step 230 may include the step of measuring device temperature inside the electrical device supporting switchable graphics function. Therefore, in step 233, the EC may control the cooling fan rotating in a first rotating mode according to the device temperature as the first control mode. Besides, in step 234, the EC may control the cooling fan rotating in a second rotating mode according to the device temperature as the second control mode.

In another embodiment, if heat generated by the first graphic chip when the first graphic chip is enabled is more than heat generated by the second graphic chip when the second graphic chip is enabled, cooling efficiency of the cooling fan in the first control mode may be set better than in the second mode. In addition, since the first graphic chip generates more heat, enable status of the first graphic chip should be taken into consideration for controlling operation status of the peripheral (step 230). Therefore, before step 232, determining if the first graphic chip is enabled (step 231) may be included. When the first graphic chip is not enabled, determine that the present graphic chip is the first or second graphic chip (step 232). When the first graphic chip is enabled, the EC controls the peripheral or the display unit operating in first control mode (step 233) to provide better cooling efficiency.

In addition, the peripheral may include at least a first indicator light. Therefore, in step 233, the EC may control the indicator light to generate a first light signal as the first control mode. In step 234, the EC may control the indicator light to generate a second light signal as the second control mode. Thus, users can determine which graphic chip is being utilized for graphic processing according to the light signal.

In another embodiment, the method for controlling the peripheral of the electrical device supporting switchable graphics function 200 may include the step of controlling the display unit to display with different brightness according to the graphic chips being utilized for graphic processing. Therefore, in step 233, the EC may control the display unit to display with first display brightness as the first control mode. In step 234, the EC may control the display unit to display with second display brightness as the second control mode. Therefore, the display unit may display with different brightness as the graphic chip being utilized for graphic processing differs.

Above all, operation status of a peripheral of an electrical device supporting switchable graphics function is controlled according to the graphic chip being utilized for graphic processing. For example, when the graphic chip, which generates more heat, is utilized for graphic processing, the peripheral may be controlled utilizing the mode with better cooling efficiency. Instead, when the graphic chip, which generates less heat, is utilized for graphic processing, the peripheral may be controlled utilizing the mode with less power consumption to further reduce power consumption of the electrical device. In addition, since operation status of the peripheral is controlled by an EC, one embodiment of this invention can be applied in all electrical devices supporting switchable graphics function without amending graphic chip drivers. Therefore, difficulty in driver amendment can be avoided according to one embodiment of this invention.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electrical device supporting switchable graphics function, electrically connected with a display unit, comprising:
   a first graphic chip;
   a second graphic chip;
   a peripheral;
   an Embedded Controller (EC), electrically connected with the peripheral, comprising:
   an EC RAM, storing information of a present graphic chip, wherein the present graphic chip is one of the first graphic chip and the second graphic chip; and
   a control unit, electrically connected with the EC RAM, comprising:
   a first obtaining module, obtaining the information of the present graphic chip from the EC RAM; and
   a peripheral-controlling module, controlling operation status of the peripheral according to the obtained information of the present graphic chip; and
   a processing unit, electrically connected with the first graphic chip, the second graphic chip and the EC, comprising:
   a second obtaining module, obtaining the information of the present graphic chip from the EC RAM; and
   a driving module, wherein the driving module drives the first graphic chip to process an image signal and transmit the processed image signal to the display unit for display when the present graphic chip is the first graphic chip, and the driving module drives the second graphic chip to process the image signal and transmit the processed image signal to the display unit for display when the present graphic chip is the second graphic chip;
   wherein the peripheral comprises a cooling fan;
   wherein heat generated by the first graphic chip when the first graphic chip is enabled is more than heat generated by the second graphic chip when the second graphic chip is enabled;
   wherein the control unit of the EC further comprises a determining module, determining if the first graphic chip is enabled;

wherein the peripheral-controlling module of the control unit of the EC comprises a fan controller controlling operating status of the cooling fan;

wherein the fan controller performs control comprising:

controlling the cooling fan rotating at a first rotational speed when the present graphic chip is the first graphic chip;

controlling the cooling fan rotating at second rotational speed when the present graphic chip is the second graphic chip; and controlling the cooling fan rotating at the first rotational speed when the first chip is enabled and the present graphic chip is the second graphic chip, the first rotational speed is faster than the second rotational speed.

2. The electrical device supporting switchable graphics function of claim 1, wherein the electrical device supporting switchable graphics function further comprises:

a temperature sensor, electrically connected with the EC, measuring device temperature inside the electrical device supposing switchable graphics function, wherein the fan controller controls the cooling fan rotating in a first rotating mode according to the device temperature when the present graphic chip is the first graphic chip, and the fan controller controls the cooling fan rotating in a second rotating mode according to the device temperature when the present graphic chip is the second graphic chip.

3. The electrical device supporting switchable graphics function of claim 2, wherein the control unit further comprises:

a determining module, determining if the first graphic chip is enabled, wherein the fan controller controls the cooling fan rotating in the first rotating mode according to the device temperature when the first chip is enabled and the present graphic chip is the second graphic chip, and cooling efficiency of the cooling fan rotating in the first rotating mode is better than that of the cooling fan rotating in the second rotating mode.

4. The electrical device supposing switchable graphics function of claim 3, wherein the determining module determines if the first graphic chip is enabled through General Purpose Input/Output (GPIO).

5. The electrical device supporting switchable graphics function of claim 1, wherein the peripheral comprises at least an indicator light, and the peripheral-controlling module comprises:

a light controller, controlling the indicator light, wherein the light controller controls the indicator light to generate a first light signal when the present graphic chip is the first graphic chip, and the light controller controls the indicator light to generate a second light signal when the present graphic chip is the second graphic chip.

6. The electrical device supporting switchable graphics function of claim 1, wherein the processing unit further comprises:

a switching module, switching the present graphic chip to the other graphic chip when a switch signal is received, such that the driving module drives the switched present graphic chip to process the image signal and transmit the processed image signal to the display unit for display; and an update module, updating the information d the switched present graphic chip into the EC RAM.

7. The electrical device supporting switchable graphics function of claim 6, further comprising:

a user interface, electrically connected with the processing unit, wherein the switch signal is generated through the user interface.

8. A method for controlling a peripheral of an electrical device supporting switchable graphics function, wherein the electrical device supporting switchable graphics function comprises a first graphic chip, a second graphic chip, the peripheral, a processing unit and an EC, the EC comprises an EC RAM, information of a present graphic chip is stored in the EC RAM, the method for controlling the peripheral of the electrical device supporting switchable graphics function comprises:

obtaining the information of the present graphic chip from the EC RAM, wherein the present graphic chip is one of the first graphic chip and the second graphic chip;

making the processing unit drive the present graphic chip to process an image signal and transmit the processed image signal to a display unit for display; and making the EC control operation status of the peripheral according to the obtained information of the present graphic chip;

wherein the peripheral comprises a cooling fan, and the step of making the EC control operation status of the peripheral according to the obtained information of the present graphic chip comprises:

determining that the present graphic chip is the first graphic chip or the second graphic chip according to the obtained information of the present graphic chip;

wherein the EC comprises a fan controller controlling operating status of the cooling fan;

wherein the step of making the EC control operation status of the peripheral according to the obtained information of the present graphic chip comprises control performed by the fan controller, comprising:

controlling the cooling fan rotating at a first rotational speed when the present graphic chip is the first graphic chip;

controlling the cooling fan rotating at a second rotational speed when the present graphic chip is the second graphic chip; and controlling the cooling fan rotating at the first rotational speed when the first graphic chip is enabled and the present graphic chip is the second graphic chip, the first rotational speed being faster than the second rotational speed;

wherein heat generated by the first graphic chip when the first graphic chip is enabled is more than heat generated by the second graphic chip when the second graphic chip is enabled.

9. The method for controlling the peripheral of the electrical device supporting switchable graphics function of claim 8, wherein the step of making the EC control operation status of the peripheral according to the obtained information of the present graphic chip comprises:

measuring device temperature inside the electrical device supporting switchable graphics function;

making the EC control the cooling fan rotating in a first rotating mode according to the device temperature when the present graphic chip is the first graphic chip; and making the EC control the cooling fan rotating in a second rotating mode according to the device temperature when the present graphic chip is the second graphic chip.

10. The method for controlling the peripheral of the electrical device supporting switchable graphics function of claim 9, further comprising:

determining if the first graphic chip is enabled before determining if the present graphic chip is the first graphic chip or the second graphic chip;

determining if the present graphic chip is the first graphic chip or the second graphic chip when the first graphic chip is not enabled; and making the EC control the cooling fan rotating in a first rotating mode according to the device temperature when the first graphic chip is enabled, wherein cooling efficiency of the cooling fan rotating in the first rotating mode is better than that of the cooling fan rotating in the second rotating mode.

11. The method for controlling the peripheral of the electrical device supporting switchable graphics function of claim 8, wherein the peripheral comprises at least an indicator light, and the step of making the EC control operation status of the peripheral according to the obtained information of the present graphic chip comprises:

making the EC control the indicator light to generate a first light signal when the present graphic chip is the first graphic chip; and making the EC control the indicator light to generate a second light signal when the present graphic chip is the second graphic chip.

12. The method for controlling the peripheral of the electrical device supporting switchable graphics function of claim 8, further comprising:

switching the present graphic chip to the other graphic chip when a switch signal is received, such that the processing unit drives the switched present graphic chip to process the image signal and transmit the processed image signal to the display unit for display; and updating the information of the switched present graphic chip into the EC RAM.

13. The method for controlling the peripheral of the electrical device supposing switchable graphics function of claim 12, wherein the switch signal is received through a user interface.

14. The method for controlling the peripheral of the electrical device supporting switchable graphics function of claim 12, further comprising:

generating the switch signal when power supply of the electrical device supporting switchable graphics function is switched.

\* \* \* \* \*